United States Patent
Pelaez et al.

(10) Patent No.: US 7,043,232 B2
(45) Date of Patent: May 9, 2006

(54) METHOD AND SYSTEM FOR SENDING PERSONALIZED OUTGOING VOICEMAIL/MULTIMEDIA MAIL MESSAGES BASED ON THE CALLER ID

(75) Inventors: Mariana Benitez Pelaez, Naperville, IL (US); Victoria Marie Halsell, Aurora, IL (US); Charu Verma, Darien, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 249 days.

(21) Appl. No.: 10/705,305

(22) Filed: Nov. 10, 2003

(65) Prior Publication Data

US 2005/0101303 A1    May 12, 2005

(51) Int. Cl.
*H04L 12/58* (2006.01)
*H04M 1/725* (2006.01)
*H04Q 7/22* (2006.01)

(52) U.S. Cl. .............................. 455/412.1; 455/412.2; 455/413; 455/414.1; 455/415; 455/417; 379/82; 379/88.12; 379/88.13; 379/88.18; 379/88.22

(58) Field of Classification Search .. 455/412.1–412.2, 455/413, 414.1, 415, 417–418, 466; 379/82, 379/88.12–88.22, 373.01–376.02
See application file for complete search history.

(56) References Cited

U.S. PATENT DOCUMENTS

| | | | |
|---|---|---|---|
| 5,933,778 A * | 8/1999 | Buhrmann et al. | 455/461 |
| 6,226,379 B1 * | 5/2001 | Swan et al. | 379/373.02 |
| 6,275,690 B1 * | 8/2001 | Higuchi et al. | 455/412.2 |
| 6,295,341 B1 * | 9/2001 | Muller | 379/88.18 |
| 6,522,876 B1 * | 2/2003 | Weiland et al. | 455/414.1 |
| 6,571,094 B1 * | 5/2003 | Begeja et al. | 455/417 |
| 6,631,183 B1 * | 10/2003 | Rautila et al. | 379/88.22 |
| 6,928,152 B1 * | 8/2005 | Takeda et al. | 379/207.02 |
| 2004/0082317 A1 * | 4/2004 | Graefen | 455/413 |

* cited by examiner

*Primary Examiner*—Stephen D'Agosta

(57) ABSTRACT

A method of sending personalized outgoing voicemail/multimedia mail messages based on the caller ID in a multimedia telecommunications network, the method including storing the subscriber's personalized outgoing voicemail and multimedia mail messages at a first network element, receiving a call having a unique caller ID for the subscriber at a second network element, determining at the second network element whether the subscriber has activated the service and whether the subscriber is unavailable to take the call, forwarding the call to the first network element where the service has been activated by the subscriber and the subscriber is unavailable to take the call, analyzing at the first network element the caller ID of the call to determine which of the stored outgoing messages is an appropriate outgoing message for the caller, and playing the appropriate outgoing message to the caller.

17 Claims, 2 Drawing Sheets

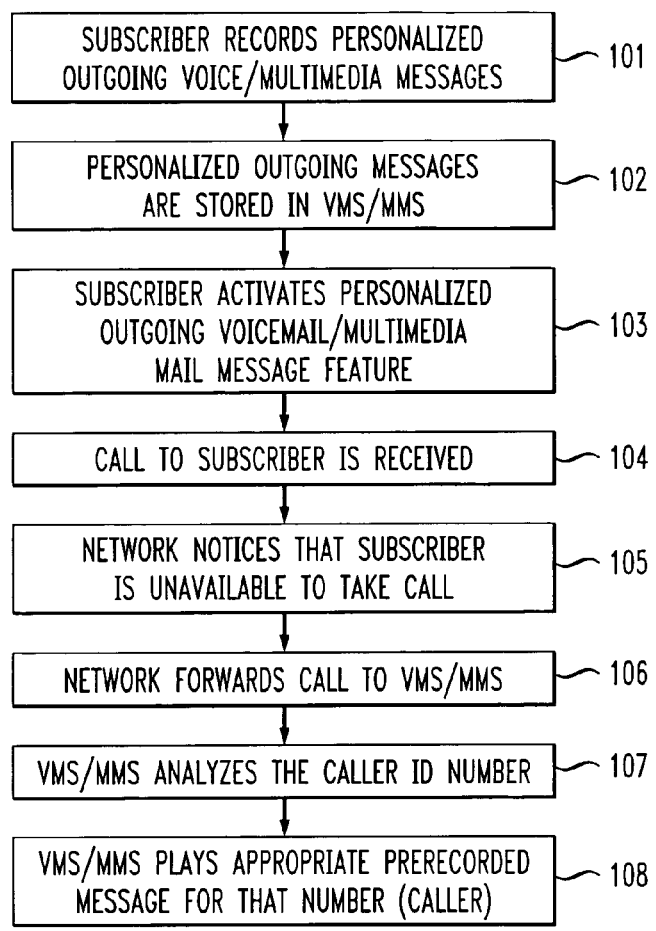
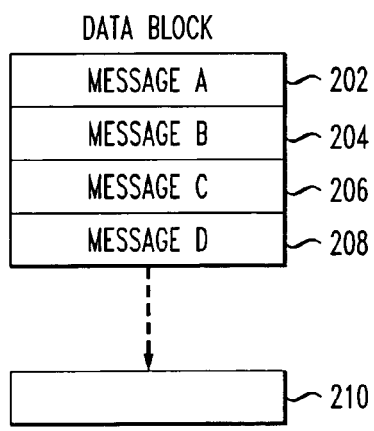

METHOD AND SYSTEM FOR SENDING PERSONALIZED OUTGOING VOICEMAIL/MULTIMEDIA MAIL MESSAGES BASED ON THE CALLER ID

FIELD OF THE INVENTION

The present invention relates to the art of telecommunications in general, and, more particularly, to a method and system for sending personalized outgoing voicemail and multimedia mail messages based on the caller ID in a multimedia telecommunications network.

BACKGROUND OF THE INVENTION

Wireless telecommunication networks generally allow mobile devices to communicate with each other and other networks, such as the Internet and the public switched telephone network. First and second generation wireless telephone systems are generally constrained in the amount of bandwidth available for communication. This limits capacity and also the types of services that can be provided. Third generation wireless systems, which are being developed through the 3rd Generation Partnership Project (3GPP), hold the promise of greater bandwidth, thereby increasing capacity and allowing for enhanced services, such as multimedia services. 3GPP is the new worldwide standard for the creation, delivery, and playback of multimedia over new, high-speed wireless networks. 3GPP enables the free sharing of multimedia files between a variety of devices, including wireless phones, PDAs (Personal Digital Assistants), and desktop computers. 3GPP devices include, in addition to a voice communication interface, capability for communication of data and display of data, including video.

Various features and services have been developed and made available to wireless customers. For example, voicemail systems, which are well known, allow callers the option to leave voicemail messages for parties who are unavailable. In order to leave a message, the caller is typically prompted to enter a command on a keypad of a handset or wait for a specified tone, or both. The voicemail system then records the voicemail message for a predetermined amount of time or until the caller ends the call. Multimedia mail is the exchange of messages consisting of at least two media within a message using the mail transport service. Proposed third generation (3G) wireless systems will permit wireless users the capability to leave multimedia messages in multimedia mail systems similar to that of voicemail systems.

Wireless service providers also offer caller identification (ID) services, which are well known, for their customers. Caller ID is the identification of the originating subscriber line. The transmission of the caller ID generally takes place between the first and second ring. The information sent includes the date, time, and calling number. The name associated with the calling number is sometimes included also. Since the time caller ID was first made available it has been expanded to offer caller ID on call waiting as well. With caller ID on call waiting, the call waiting tone is heard and the identification of the second call may be displayed on the called party's device.

Wireless customers are also able to activate voice greetings (and soon multimedia greetings) that are played when the subscriber is not available to answer the call. Nonetheless, wireless customers are not able to personalize for different callers their outgoing voice and/or multimedia messages through their voicemail/multimedia mail system.

Thus, a need exists for a method and system for allowing a subscriber to personalize outgoing voicemail and/or multimedia mail messages for different calling parties based upon their caller ID in a multimedia telecommunications network.

SUMMARY OF THE INVENTION

In accordance with one aspect of the present invention, a method of sending personalized outgoing voicemail/multimedia mail messages based on the caller ID in a multimedia telecommunications network is provided. The method includes storing the subscriber's personalized outgoing voicemail and multimedia mail messages at a first network element, receiving a call having a unique caller ID for the subscriber at a second network element, and determining at the second network element whether the subscriber has activated the service and whether the subscriber is unavailable to take the call. Where the service has been activated by the subscriber and the subscriber is unavailable to take the call, the call is forwarded to the first network element. At the first network element, the caller ID of the call is analyzed to determine which of the stored outgoing messages is an appropriate outgoing message for the caller. Finally, the appropriate outgoing message is played to the caller.

In accordance with another aspect of the present invention, a system for sending personalized outgoing voicemail/multimedia mail messages based on the caller ID is provided. The system includes a first system element for storing the subscriber's personalized outgoing voicemail and multimedia mail messages, a second system element for receiving a call having a unique caller ID for the subscriber, means for determining at the second network element whether the subscriber has activated the service and whether the subscriber is unavailable to take the call, where the service has been activated by the subscriber and the subscriber is unavailable to take the call, means for forwarding the call to the first network element, means for analyzing at the first network element the caller ID of the call to determine which of the stored outgoing messages is an appropriate outgoing message for the caller; and means for playing the appropriate outgoing message to the caller.

An object of the present invention is to provide a wireless service whereby subscribers may record personalized outgoing voicemail/multimedia mail messages to be played to different calling parties based on the caller ID.

Still further advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 2 is a flow chart illustrating a method of sending personalized outgoing voicemail/multimedia mail messages in accordance with an aspect of the present invention.

FIG. 3 is memory layout of data stored in the centralized database in accordance with an aspect of the present invention.

DETAILED DESCRIPTION OF THE INVENTION

Figure 1:
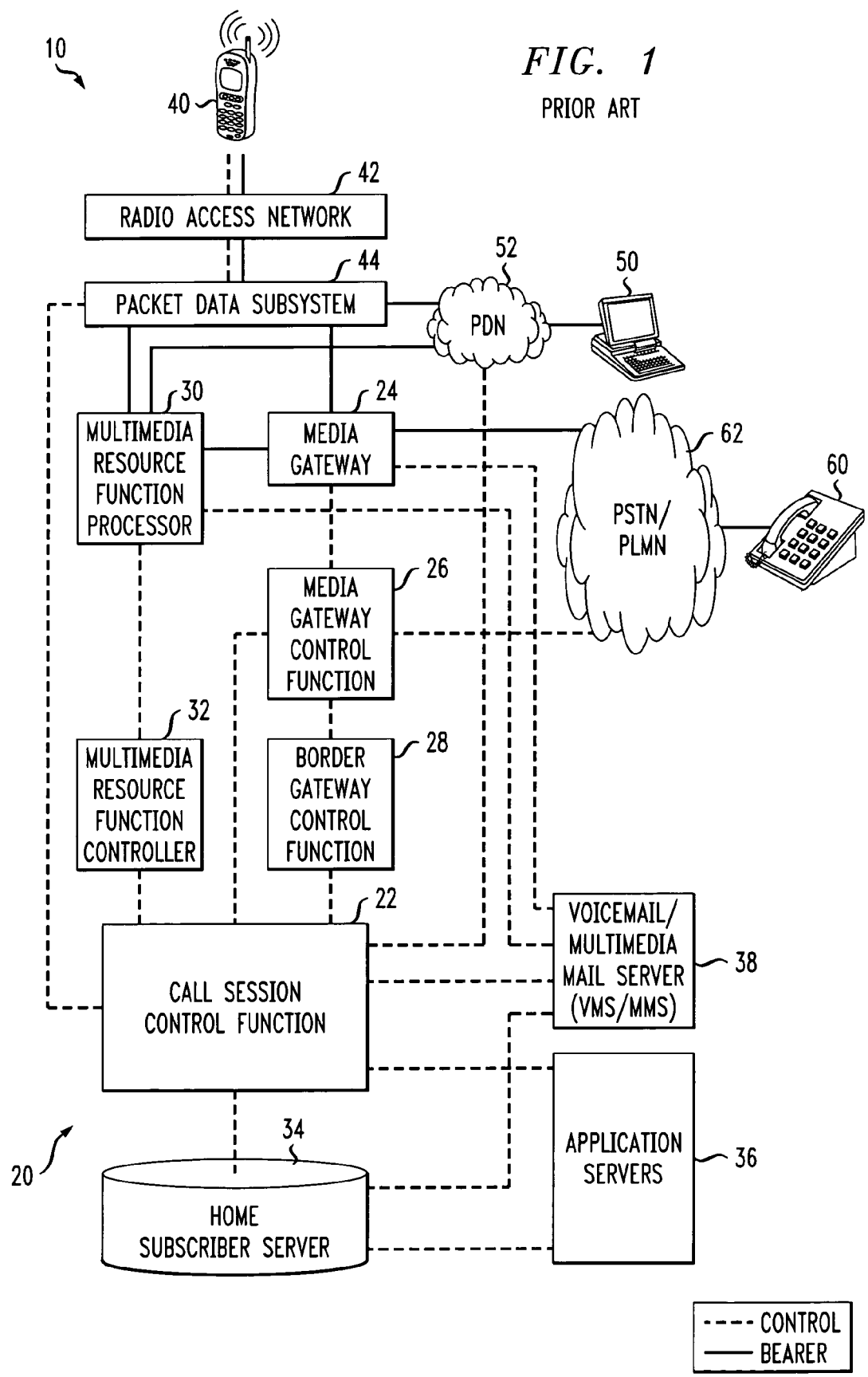
FIG. 1 is a block diagram showing a known multimedia telecommunications environment suitable for practicing aspects of the present invention.

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention.

3G—$3^{rd}$ Generation
3GPP—$3^{rd}$ Generation Partnership Project
3GPP2—$3^{rd}$ Generation Partnership Project 2
AAA—Authentication/Authorization/Accounting
AH—Address Handling
AS—Application Server
BGCF—Border Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MMT—Multimedia Terminal
MRFC—Multimedia Resource Function Controller
MRFP—Multimedia Resource Function Processor
PDN—Public Data Network
PLMN—Public Land Mobile Network
PSDN—Packet Switched Data Network
PSTN—Public Switched Telephone Network
PTT—Push-to-Talk
RAN—Radio Access Network
SIP—Session Initiation Protocol
SMS—Short Message Service
SMT—Single Media Terminal
SPD—Serving Profile Database
UMTS—Universal Mobile Telecommunications System
VoIP—Voice over IP
WLAN—Wireless Local Area Network FIG. 1 is a block diagram of a typical multimedia telecommunications network 10 in which the present invention may be implemented. The multimedia telecommunications network 10 provides users with a variety of options for communication and is generally known in the art. The network 10 provides access to data networks, such as the Internet, and public telephone networks, including wireless networks. With this network, users are able to transmit and receive multimedia communications, including audio, voice, video, and all types of data.

The multimedia telecommunications network 10 preferably includes an IP multimedia subsystem (IMS) 20, which is well known in the art. The IMS 20 relates to a technology standardized by the $3^{rd}$ Generation Partnership Project, also known as 3GPP, and is used to join mobile communication with IP technologies by adding the ability to deliver integrated voice and data services over the IP-based packet switched network. IMS services are based on the Session Initiation Protocol (SIP), which is the signaling protocol standard for next-generation 3GPP mobile wireless networks. The IMS 20 typically includes a number of system elements, such as a call session control function (CSCF) 22, media gateways (MGW) 24, a media gateway control function (MGCF) 26, a border gateway control function (BGCF) 28, a multimedia resource function processor (MRFP) 30, a multimedia resource function controller (MRFC) 32, a home subscriber system (HSS) 34, application servers (AS) 36, and a voicemail/multimedia mail server (VMS/MMS) 38. As is known in the art, the IMS 20 manages call sessions and provides and administers packet switching for multimedia communications within the network 10.

A first communication device 40 is shown in FIG. 1. The first communication device 40 may be a wireless device that includes a user interface and an interface for coupling to a radio access network (RAN) 42. The user interface of the communication device 40 is typically referred to as terminal equipment and generally includes an audio interface, such as a microphone and speakers, a visual interface, such as a display, and a user input interface, such as a keyboard or touch pad. The interface for coupling to the RAN 42 is typically referred to as a mobile terminal and generally includes an over-the-air interface for transmitting and receiving data. The over-the-air interface of the communication device 40 is used to communicate with base stations in the RAN 42. Preferably, the communication device 40 and the base stations in the RAN 42 communicate over-the-air using a packet-based protocol. A packet data subsystem (PDS) 44 couples the RAN 42 with the IMS 20 and the public data network (PDN) 52 in the usual manner.

A second communication device 50 is shown as a laptop or notebook computer operatively connected to the IMS 20 via the PDN 52. The communication device 50 optionally employs a wireless local area network (WLAN) or wire line, in the usual manner, to operatively connect to the PDN 52. A third communication device 60 is shown as an ordinary telephone equipped to handle only voice communications. The communication device 60 is operatively connected to the IMS 20 via the public switched telephone network/public land mobile network (PSTN/PLMN) 62.

Only three communication devices (40, 50, and 60) are shown in FIG. 1 for the purpose of simplifying the diagram. However, it is to be appreciated that any number of such terminals are typically situated in the multimedia telecommunications network 10. Additionally, while each is depicted as a specific type of communication device, other like terminals may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP and other known protocols are used on the control and bearer paths, respectively. For example, the known H.248 protocol is suitably employed for media gateway control. The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

The CSCF 22 supports and controls multimedia sessions. The CSCF 22 invites elements such as the MGCF 26 and the MRFC 32 to call sessions to control the establishment and maintenance of bearer paths for call sessions by adding, modifying or deleting appropriate bearer paths for respective call sessions. The CSCF 22 is the signaling entity for call session control. It manages sessions by using SIP and/or other appropriate call/session establishment protocols, and it provides features and services and coordinates with other network elements for session control, service control and resource allocation.

The CSCF 22 may provide the following functionalities: incoming call gateway, call control function, serving profile database, and address handling. By functioning as an incoming call gateway the CSCF 22 acts as a call session entry point and routes incoming calls. The call control function generally refers to call setup/termination and state/event management. The CSCF 22 interacts with the MGCF 26 for calls to/from the PSTN/PLMN 62 and with the BGCF 28 for calls to the PSTN/PLMN 62 to determine the appropriate MGCF 26 to use. It also controls the MRFP 30 via the MRFC 32, which interprets information or signals coming from the CSCF 22 and controls the MFRP 30, in order to support conferencing and other multi-party services. SIP level registrations from subscribers are processed with the call control function. The call control function may also provide service trigger mechanisms to the application servers 24 to invoke services provided thereby, either locally, at the application servers 24, or elsewhere. It also reports call events for billing, auditing, intercept or other purposes, and may query the address handling function to check whether a requested communication is allowed given the current subscription. The serving profiling database function refers to the interaction of the CSCF 22 with the HSS 34 to receive and cache user profile information. The address handling function refers to address analysis, translation, modification (when appropriate) and mapping.

The MGW 24 acts as a bearer path interface between the IMS 20 and external networks and/or subsystems, and provides translation resources and resources for modifying the bearer stream (e.g., encoding, transcoding, compression, packetization, depacketization, etc.). The bearer path elements include the MGCF 26, the MRFC 32, and the BGCF 28. These elements provide the flexibility to add, modify or delete bearers used by the users' services. More particularly, the MGW 24 interacts with the MGCF 26, which interprets signaling coming from the CSCF 22 and controls the MGW 24 to achieve resource allocation, bearer path control, and payload processing. The MGCF 26 communicates with the CSCF 22 in order to control the call state for media channels on one or more MGWs and performs conversions between Legacy and 3G Universal Mobile Telecommunications System (UMTS)/Code Division Multiple Access (CDMA) network call control protocols. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24). The BGCF 28 selects the proper MGCF 26.

The HSS 34 is coupled to the CSCF 22 via a data link. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The application servers 36 are preferably coupled to the IMS 20 for use in interaction with the communication devices 40, 50, 60. In particular, the CSCF 22 is coupled to the application servers 36 via a data link. Also, the HSS 34 is preferably coupled to the application servers 36. A myriad of services and applications may reside in or be coupled to the application servers 36, including a communication session type and quality selection method and system in accordance with the present invention.

The VMS/MMS 38 is preferably coupled to the IMS 20 for use in interaction with the communication devices 40, 50, 60 and to the CSCF 22 via a data link. Also, the VMS/MMS 38 is preferably coupled to the HSS 34. There are additional data links from the VMS/MMS 38 to the MGW 24 and to the MRFP 30. The VMS/MMS 38 provides voicemail and multimedia mail services for subscribers.

In the preferred embodiment, the CSCF 22, the MGCF 26, the MGW 24, the HSS 34, the application servers 36, and the VMS/MMS 38 are all processor-based devices with data link interfaces for coupling together as described above and shown in FIG. 1. These devices include one or more processors that execute programs to implement the functionality described herein and generally associated with 3GPP/3GPP2 wireless systems. The flexibility of these processor-based systems permits ready integration into these systems of a personalized outgoing voicemail/multimedia mail message method and system in accordance with the present invention.

FIG. 2 shows a preferred method 100 for sending personalized outgoing voicemail/multimedia mail messages based on the caller ID. FIG. 2 is described below with reference to the multimedia telecommunications network 10 of FIG. 1. Let us assume that a wireless subscriber wants to play a special outgoing voicemail or multimedia mail message when receiving a call from a certain caller or group of callers. Thus, initially, in step 101, the subscriber would record any number of personalized outgoing voicemail and/or multimedia mail messages for specific callers based upon their caller IDs (see Table 1 below).

TABLE 1

| CALLER ID | MESSAGE |
|---|---|
| Phone Numbers 1–10 | Message A (voice) |
| Phone Number 11 | Message B (video) |
| Phone Numbers 12–20 | Message C (voice) |
| All Other Phone Numbers | Message D (default voice message) |

The actual recording of the voice and/or multimedia messages can be made by any known method such as through the first communication device 40 or by logging on to the service provider's Internet Web site and updating their information via the Web through a suitable communication device. The message can be a standard voice message, a video message, or even a text message, depending upon the capabilities of the communication device being used (e.g., mobile phone, PDA, or notebook computer). The personalized outgoing messages corresponding to the specified caller IDs are preferably stored in a centralized database such as the VMS/MMS 38 (step 102). Each message would preferably include a field for the associated caller ID(s) as well as a field indicating the status of the feature (e.g., active/inactive), although other fields may be associated with the message. Also, depending upon the type of message and equipment involved, text-to-speech or speech-to-text conversion may be necessary.

The centralized database, such as the VMS/MMS 38, may include a number of data sub-blocks for each subscriber, as illustrated in FIG. 3. They are shown as a super block 200, not all of whose fields are filled for a particular subscriber. The super block, as known in the art, can be accessed from the identity of any one of several fields in the super block. The super block 200 may include the following data sub-blocks: a block 202 containing Message A; a block 204 containing Message B; a block 206 containing Message C; and a block 208 containing Message D. Of course, any number of additional blocks 210 may be provided in the super block 200 for storing other subscriber data.

The subscriber then activates the personalized outgoing voicemail/multimedia mail message feature (step 103). The activation of this feature can be made through any known method, such as by entering a feature activation code (e.g., *78) on a mobile telephone or via the service provider's Web site.

Next, a call for the subscriber is received at the CSCF 22 in the usual manner (step 104). That is, calls from personal computers, as represented by the communication device 50, are routed through the PDN 52 to the CSCF 22. On the other hand, calls from PSTN users, as represented by the communication device 60, are routed through the appropriate MGCF 26 (signaling) to the CSCF 22 and the appropriate MGW 24 for the bearer path. Calls from a mobile are routed through the appropriate Radio Access Network 42 to the CSCF 22. In step 105, if the CSCF 22 notices that the subscriber has activated the personalized outgoing voicemail/multimedia mail message feature and if the subscriber is unable to take the call either because he or she is out of the service area, has turned off its device, is busy and wishes not to answer the incoming call, etc., then the call is sent to the VMS/MMS 38. The CSCF 22 then forwards the call, including the caller ID information, to the VMS/MMS 38 for further processing (step 106). The VMS/MMS 38 analyzes the caller ID for the call and compares it to the subscriber's stored instructions (step 107). This analysis can be made through a computer program implemented in the VMS/MMS 38. The VMS/MMS 38 then locates the appropriate voicemail/multimedia message for that caller ID, or, if no match is found, a default VMS/MMS message is played (step 108).

Thus, the invention allows wireless customers to record personalized voice greetings and/or multimedia greetings via that can be played for specific callers when the subscriber is not available to answer the call.

The invention has been described with reference to the preferred embodiments. Obviously, modifications and alterations will occur to others upon reading and understanding the preceding detailed description of the preferred embodiments. It is intended that the invention be construed as including all such modifications and alterations insofar as they come within the scope of the appended claims or the equivalence thereof.

What is claimed is:

1. In a multimedia telecommunications network having facilities for providing a voicemail and multimedia mail service to a subscriber, a method of sending a personalized outgoing voicemail or multimedia mail message to a caller, the method comprising:
   storing the subscriber's personalized outgoing voicemail and multimedia mail messages at a first network element;
   receiving a call having a unique caller ID for the subscriber at a second network element;
   determining at the second network element whether the subscriber has activated the service and whether the subscriber is unavailable to take the call;
   where the service has been activated by the subscriber and the subscriber is unavailable to take the call, forwarding the call to the first network element;
   analyzing at the first network element the caller ID of the call to determine which of the stored outgoing messages is an appropriate outgoing message for the caller; and
   playing the appropriate outgoing message to the caller, wherein each of the subscriber's personalized outgoing voicemail and multimedia mail messages includes at least three fields, the fields comprising a message field, an associated caller ID field, and a feature activation status field.

2. The method defined in claim 1, wherein the network includes an IP multimedia subsystem.

3. The method defined in claim 2, wherein the first network element comprises a voicemail/multimedia mail server.

4. The method defined in claim 3, wherein the second network element comprises a call session control function.

5. The method defined in claim 1, wherein the service is activated by entering a feature activation code.

6. The method defined in claim 1, wherein the service is activated by using the Internet.

7. A multimedia telecommunications system for providing a voicemail and multimedia mail service to a subscriber, the system comprising:
   a first system element for receiving a call having a unique caller ID for the subscriber, determining whether the subscriber has activated the service, and determining whether the subscriber is unavailable to take the call;
   a second system element for storing the subscriber's personalized outgoing voicemail and multimedia mail messages, analyzing the caller ID of the call to determine which of the stored outgoing messages is an appropriate outgoing message for the caller, and playing the appropriate outgoing message to the caller, wherein each of the subscriber's personalized outgoing voicemail and multimedia mail messages includes at least three fields, the fields comprising a message field, an associated caller ID field, and a feature activation status field.

8. The system defined in claim 7, wherein the system comprises an IP multimedia subsystem.

9. The system defined in claim 8, wherein the first network element comprises a voicemail/multimedia mail server.

10. The system defined in claim 9, wherein the second network element comprises a call session control function.

11. The system defined in claim 10, wherein the service is activated by entering a feature activation code.

12. The system defined in claim 10, wherein the service is activated by using the Internet.

13. A multimedia telecommunications system having facilities for providing a voicemail and multimedia mail service to a subscriber, the system including:
   means for storing the subscriber's personalized outgoing voicemail and multimedia mail messages at a first network element;
   means for receiving a call having a unique caller ID for the subscriber at a second network element;

means for determining at the second network element whether the subscriber has activated the service and whether the subscriber is unavailable to take the call;

where the service has been activated by the subscriber and the subscriber is unavailable to take the call, means for forwarding the call to the first network element;

means for analyzing at the first network element the caller ID of the call to determine which of the stored outgoing messages is an appropriate outgoing message for the caller; and means for playing the appropriate outgoing message to the caller, wherein each of the subscriber's personalized outgoing voicemail and multimedia mail messages includes at least three fields, the fields comprising a message field, an associated caller ID field, and a feature activation status field.

14. The system defined in claim 13, wherein the system comprises an IP multimedia subsystem.

15. The system defined in claim 14, wherein the first network element comprises a voicemail/multimedia mail server.

16. The system defined in claim 15, wherein the second network element comprises a call session control function.

17. The system defined in claim 13, wherein the service is activated by entering a feature activation code or by using the Internet.

* * * * *